United States Patent
Kim

(10) Patent No.: US 10,248,307 B2
(45) Date of Patent: Apr. 2, 2019

(54) VIRTUAL REALITY HEADSET DEVICE WITH FRONT TOUCH SCREEN

(71) Applicant: Adobe Inc., San Jose, CA (US)

(72) Inventor: Byungmoon Kim, Sunnyvale, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 14/867,917

(22) Filed: Sep. 28, 2015

(65) Prior Publication Data

US 2017/0090744 A1    Mar. 30, 2017

(51) Int. Cl.
| | | |
|---|---|---|
| G06F 3/0484 | (2013.01) | |
| G06F 3/0488 | (2013.01) | |
| G06F 3/01 | (2006.01) | |
| G06F 1/16 | (2006.01) | |

(52) U.S. Cl.
CPC .......... *G06F 3/04883* (2013.01); *G06F 1/163* (2013.01); *G06F 1/1643* (2013.01); *G06F 3/011* (2013.01); *G06F 3/013* (2013.01); *G06F 3/04842* (2013.01); *G06F 3/04886* (2013.01)

(58) Field of Classification Search
None
See application file for complete search history.

(56) References Cited

U.S. PATENT DOCUMENTS

| | | | | |
|---|---|---|---|---|
| 2002/0118175 A1* | 8/2002 | Liebenow | ............. | G06F 1/1626 345/168 |
| 2011/0123018 A1* | 5/2011 | Chuang | ............. | H04M 1/72577 379/387.01 |
| 2013/0301830 A1* | 11/2013 | Bar-El | ....................... | H04L 9/08 380/210 |
| 2015/0323990 A1* | 11/2015 | Maltz | ................. | G02B 27/0179 345/173 |
| 2016/0018853 A1* | 1/2016 | Buckley | ............. | G02B 27/0176 345/174 |
| 2016/0029883 A1* | 2/2016 | Cox | ......................... | G06F 3/013 351/209 |
| 2016/0139724 A1* | 5/2016 | Miller | ................... | G06F 3/0488 345/173 |

* cited by examiner

*Primary Examiner* — Jennifer Mehmood
*Assistant Examiner* — Parul H Gupta
(74) *Attorney, Agent, or Firm* — Keller Jolley Preece

(57) ABSTRACT

This disclosure relates to systems, methods, and devices for interacting with a virtual reality environment via a virtual reality headset device. In particular, one or more embodiments include a display screen secured to a housing frame. One or more embodiments also include a touch interface positioned in a relative position with respect to the display screen. In addition, an area of the touch interface can be mapped to an area of the display screen. As such, one or more embodiments also detect a user interaction at the touch interface and provide a response to the display screen in accordance with a position of the user interaction at the touch interface.

20 Claims, 7 Drawing Sheets

VIRTUAL REALITY HEADSET DEVICE WITH FRONT TOUCH SCREEN

BACKGROUND

1. Technical Field

One or more embodiments relate generally to virtual reality devices and systems and methods for providing input to a virtual reality device. More specifically, one or more embodiments relate a touch interface on a front surface of a virtual reality headset device for the purpose of providing input to the virtual reality headset device.

2. Background and Relevant Art

Virtual reality devices allow users to view media in an immersive environment. For example, virtual reality headset devices allow users to experience more complex and realistic environments by displaying three-dimensional content, or simulated three-dimensional content, within a virtual reality environment. To illustrate, many virtual reality headset devices are capable of displaying three-dimensional movies, video games, scenes, or simulations that allow users to interact with the virtual reality environment.

When interacting with a virtual reality environment, conventional virtual reality devices allow a variety of different techniques for users to provide input to interact with a virtual reality environment. Specifically, some conventional virtual reality devices allow users to provide input by way of one or more cameras capturing a user's hand gestures, such as pointing gestures, pinching gestures, or hand movements. Hand gestures, however, require the use of cameras and large amounts of computation, which can reduce battery life and increase the costs associated with the virtual reality devices. Additionally, hand recognition is often not reliable, and hardware designed to recognize hand motions frequently fail to recognize or incorrectly interpret hand motions. Moreover, users can often find the use of hand gestures as complicated, especially when there is a lack of an intuitive connection between a desired input and a corresponding hand gesture.

Alternatively, some conventional virtual reality devices allow users to provide input to interact with a virtual reality device using touch gestures on small touch interfaces. Although these types of conventional virtual reality devices allow users to interact with a touchpad or touch sensor, the types of hand or touch gestures are often limited to a small number of gestures, and thus the types of input that a user can provide is also limited. For example, conventional touch interfaces on virtual reality devices limit users to a few touch gestures, such as clicks, tap gestures or swipe gestures, requiring users to use handheld controllers for more complex input operations. Additionally, the touch gestures may not be very intuitive for users with little experience using virtual reality devices due to the positioning of the touch interfaces on the various virtual reality devices.

These and other disadvantages may exist with respect to conventional virtual reality devices and virtual reality user input techniques.

SUMMARY

One or more embodiments provide benefits and/or solve one or more of the foregoing or other problems in the art with devices, systems, and methods for providing user interaction for use in a virtual reality environment. For instance, one or more embodiments include a virtual reality headset device having a headset with a housing frame. Additionally, example embodiments of the virtual reality headset device include a display screen at a front, inner portion of the housing frame. One or more embodiments of the virtual reality headset device also include a plurality of lenses positioned in front of the display screen in accordance with predetermined eye positions. Moreover, one or more embodiments of the virtual reality headset device also include a touch interface on a front, outer surface of the housing frame, i.e., on the opposite side of the housing from the display screen.

Additionally, one or more embodiments of the virtual reality headset device provide one or more systems and or methods of detecting a user interaction (e.g., a touch gesture) with the touch interface on the front surface of the housing frame, and generating an input corresponding to the detected user interaction. In particular, one or more systems or methods include determining a location on the display screen that corresponds with a detected user interaction based on a position of the user interaction on the touch interface. For example, in one or more embodiments, the location on the display screen that corresponds with a detected user interaction is relative to predetermined eye positions. In addition, one or more embodiments of the systems and methods generate and provide a response on the display screen in accordance with the determined location of the display screen. For example, based on the corresponding location of the display screen, the systems and methods can include selecting a graphical element located at the determined location on the display screen, moving a graphical element located at the determined location on the display screen, etc.

Additional features and advantages of one or more embodiments of the present disclosure will be set forth in the description which follows, and in part will be obvious from the description, or may be learned by the practice of such example embodiments. The features and advantages of such embodiments may be realized and obtained by means of the instruments and combinations particularly pointed out in the appended claims. These and other features will become more fully apparent from the following description and appended claims, or may be learned by the practice of such example embodiments as set forth hereinafter.

BRIEF DESCRIPTION OF THE DRAWINGS

In order to describe the manner in which the above recited and other advantages and features may be obtained, a more particular description of embodiments systems and methods briefly described above will be rendered by reference to specific embodiments thereof that are illustrated in the appended drawings. It should be noted that the Figures are not drawn to scale, and that elements of similar structure or function are generally represented by like reference numerals for illustrative purposes throughout the Figures. Understanding that these drawings depict only typical embodiments and are not therefore to be considered to be limiting of its scope, the systems and methods will be described and explained with additional specificity and detail through the use of the accompanying drawings in which.

DETAILED DESCRIPTION

Figure 1:
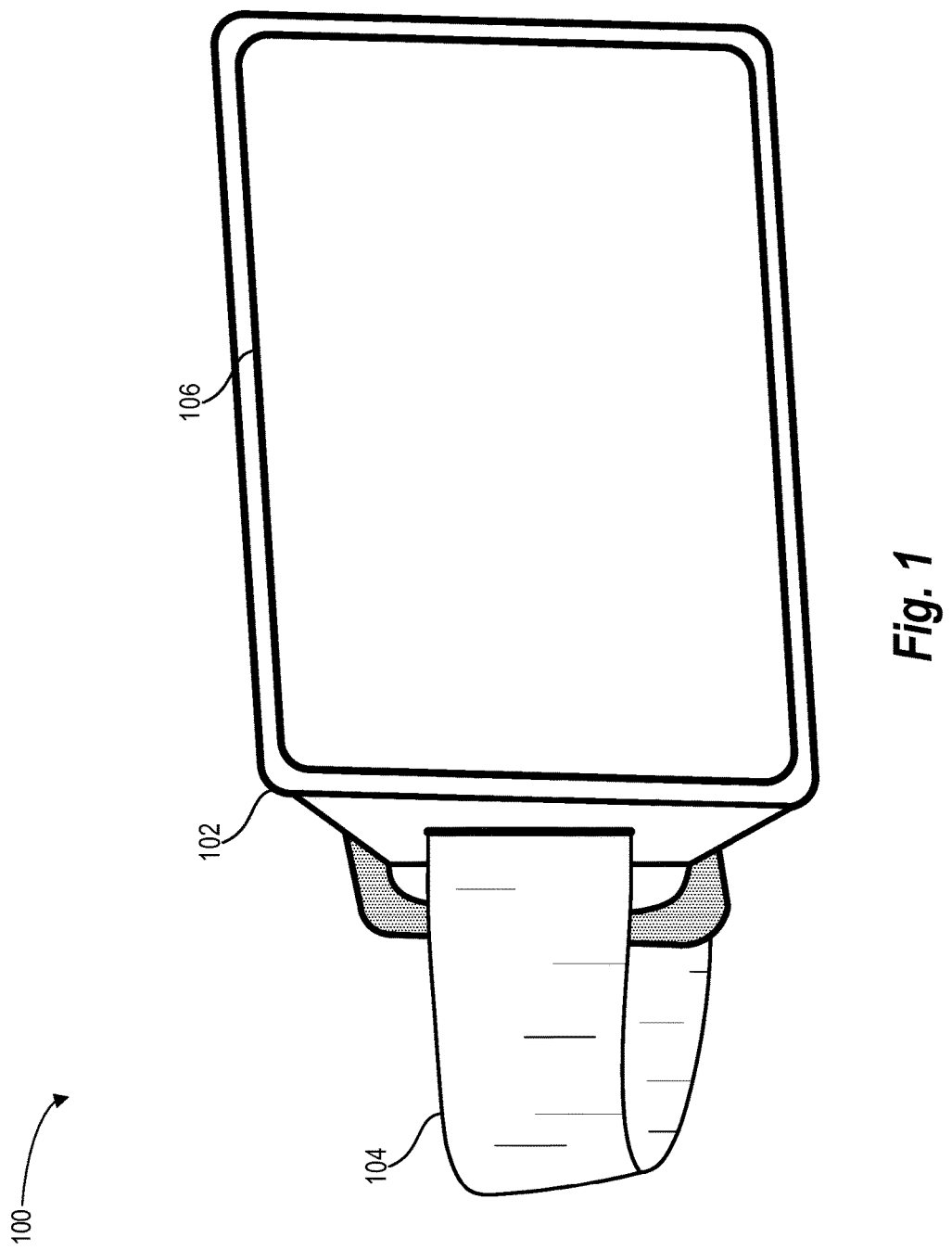
FIG. 1 illustrates an embodiment of a virtual reality headset device in accordance with one or more embodiments.

One or more embodiments of the present disclosure include a virtual reality headset device for providing a virtual reality environment to a user. In particular, one or more embodiments of the virtual reality headset device (or simply "device") allow a user to easily and intuitively provide a user interaction to perform one or more actions within a virtual reality environment. For example, device includes a display screen secured to a housing frame and facing a pair of lenses on a first side of the display screen. In addition, for example, the device includes a touch interface on an outer surface positioned on a second side of the display screen, where the second side is opposite the first side. Because the touch interface is on the front of the device, the device can receive a user interaction and provide the user interaction to the display screen in a way that is natural and intuitive to a user. To illustrate, as the device detects user interaction at the touch interface, the device generates a response on the display screen that corresponds with a position of the user interaction at the touch interface. In one or more embodiments, an area of the touch interface is mapped to an area of the display screen based on predetermined eye positions of a user.

In one or more embodiments, the device provides an indication of the user interaction on the display screen. Specifically, as a user applies a user interaction to the touch interface, the device detects the user interaction and displays a visual indication of the user interaction on the display device. For example, the device can display a visual indication that the user interaction corresponds to the selected element. Because the position of the user interaction on the touch interface corresponds to the location on the display screen, the user is able to easily select elements without guessing where the user interaction will correspond on the display screen. The visual indication can also allow the user to easily locate the position of the user interaction relative to the display screen.

According to one or more additional embodiments, the device provides improved security via the touch interface on the front surface of the housing frame. In particular, the device displays a keyboard with a plurality of selectable elements in one of a variety of layouts to the user for entering passwords, etc. Because only the user of the device can perceive a particular displayed layout, other users will have difficulty stealing a user's password. For example, the device can display the keyboard with a first layout in response to a first request to enter a password, and a second layout in response to a second request to enter a password. By changing the layout of the elements on the display screen each time the user enters a password, the device prevents others from learning passwords just by looking at the position of the user's fingers on the touch interface.

One or more embodiments of the virtual reality headset device also allow for multi-user interactions on the touch interface. For example, the touch interface can cover a large area of the front of the housing frame to allow space for multi-user interactions. To illustrate, a user can use a plurality of fingers to perform an action on the touch interface in connection with the virtual reality environment. Allowing multi-user interactions increases the number and types of input gestures that a user is able to provide over touch interfaces for conventional virtual reality devices.

As used herein, the terms "user interaction" refer to a user providing a touch gesture to a touch interface. For example, touch gestures include, but are not limited to, tap gestures, swipe gestures, pinch gestures, de-pinch gestures, single or multi-finger gestures, etc.

As used herein, the term "touch interface" refers to a surface or region of the virtual reality headset device by which a user can provide a user interaction to the device. For example, a touch interface can include a physical touchpad or touch-sensitive surface on a portion of the virtual reality headset device. The virtual reality headset device can also include a processor to detect and interpret user interaction at the touch interface for a user to interact with the virtual reality environment.

As used herein, the terms "predetermined eye positions" refer to a position of a user's eyes when a user is wearing and using a virtual reality headset device. For example, a virtual reality headset device can calculate a predetermined position or each of a user's eyes (i.e., a predetermined left eye position and a predetermined right eye position). In one or more embodiments, a predetermined eye position can be a point or small area measured for the specific user. In other embodiments, a predetermined eye position can be a range corresponding to an average person's eye.

As used herein, the term "housing frame" refers to a frame that allows the virtual reality headset device to rest on a user's head. For example, the housing frame can include a portion that rests in front of the user's eyes, and can be connected to, or include, a strap or other support element that keeps the device in position on the user's head. Additionally, a housing frame can include components of the virtual reality headset device, such as a display screen, a processor, an electronic storage medium, and/or other components.

FIG. 1 illustrates an embodiment of a virtual reality headset device 100 (or simply, "VR device"). In one or more embodiments, the VR device 100 includes a housing frame 102, a support element (e.g., a strap) 104, and a touch interface 106. The VR device 100 also includes a display screen inside the housing frame 102, and a plurality of lenses (described in more detail in FIG. 2). In additional, or alternative, embodiments, the VR device 100 can include additional components, features, or capabilities. For example, the VR device 100 can include or allow other input devices, such as motion sensors, accelerometers, gyroscopes, cameras or handheld controllers.

As mentioned, the VR device 100 can provide a virtual reality environment to a user. For instance, the VR device 100 can display a movie, panoramic scene, photographs or images, content browser (e.g., a photo or media content album), and/or three-dimensional environment to the user via the display screen. In at least some instances, the VR device 100 can allow the user to interact with the virtual reality environment by way of one or more input devices. For example, the user can change the view within the environment or move within the environment by moving his or her head or physically moving from one location to another (i.e., changing the position of the user's head laterally or vertically).

The VR device 100 also includes a support element 104 to hold the VR device 100 in place as the user views the virtual reality environment provided by way of the display screen. Specifically, the support element 104 can hold the VR device 100 in place so that the perspective of displayed content provided to the user is consistent. In one example, the support element 104 can be a flexible strap. Alternatively, the support element 104 can be an adjustable support element 104 that allows the user to adjust the fit of the VR device 100 for comfort and stability.

In one or more embodiments, the VR device 100 can allow the user to interact with the virtual reality environment and/or an operating system or other software by which the VR device 100 displays the virtual reality environment. Specifically, a user can interact with the VR device 100 using the touch interface 106. The VR device 100 includes the touch interface 106 on a front, outer surface of the housing frame 102, as illustrated in FIG. 1. The touch interface 106 can allow the user to use touch gestures to perform a variety of operations within the virtual reality environment and/or the VR device 100 operating system.

As previously mentioned, the touch interface 106 can include a touch sensitive region of the front, outer surface of the housing frame 102 that allows the VR device 100 to detect and interpret touch gestures from the user. For example, the touch interface 106 can communicate with a processor to detect and interpret a plurality of different touch gestures from a user. To illustrate, the user can perform a variety of single-touch or multi-touch gestures on the touch interface 106 to perform different operations in connection with the virtual reality environment. In one or more embodiments, the touch gestures can include, but are not limited to, tap gestures using one finger, tap gestures using a plurality of fingers, swipe motions, pinch gestures, finger spread gestures, touch-and-drag gestures, and touch-and-hold gestures.

In one or more additional embodiments, the VR device 100 can interpret user interactions based on when the user begins and/or ends the interaction with the touch interface 106. For example, the VR device 100 can trigger an event in response to the end of the user interaction, rather than the beginning of the user interaction, to allow the user to more accurately position the user interaction relative to the display screen. To illustrate, when the user begins a touch interaction with a button element by placing a finger on the touch interface 106, the VR device 100 can identify the location of the response on the display screen and display a cursor or other visual indicator at the location without triggering a button-click event. The user can then slide the finger across the touch interface 106, causing the visual indicator to move over the button on the display screen and end the user interaction by taking the finger off of the touch interface 106 to trigger the button-click event.

Because the touch interface 106 can support a variety of touch gestures, a user can provide one or more user interactions with the VR device 100 to perform a wide range of operations. For example, based on one or more user interactions, a user can select, move, edit, delete or otherwise modify one or more selectable elements displayed on the display device. In addition, a user can provide one more user interactions to navigate through one or more menus displayed on the display device. Further more, a user can provide a user interaction to zoom in or zoom out on content within the virtual reality environment that is displayed on the display screen (e.g., by providing a pinch or depinch touch gesture to the touch interface 106).

Additionally, because the touch interface 106 is located on the front surface of the housing frame 102 of the VR device 100, the user can interact with the VR device 100 in a more intuitive way than with conventional touch interfaces on conventional VR devices. Specifically, because the touch interface 106 is located on the front surface of the housing frame 102 (e.g., parallel and inline with the display screen), the user is more easily able to locate the user interaction relative to content displayed on the display screen than if the touch interface 106 is located on another area of the housing frame 102. For example, the touch interface 106 can be located in a position that allows the user to easily understand the positions of user interactions on the touch interface 106 to the corresponding locations on the display screen.

In one or more embodiments, the VR device 100 generates a response on the display screen in accordance with a position of a user interaction on the touch interface 106. In some example embodiments, the VR device 100 can map an area of the touch interface 106 to an area of the display screen based on predetermined eye positions. In particular, the VR device 100 can determine a plurality of predetermined eye positions corresponding to a left eye position and a right eye position. The VR device 100 can use the predetermined eye positions to determine a location on the display screen that corresponds to the user interaction at a position on the touch interface 106. For example, the location on the display screen can be determined based on the position of the user interaction at the touch interface 106, and then applying an adjustment based on the predetermined eye positions, such that the VR device 100 calculates the location on the display screen based on the position of the user interaction at the touch interface 106 relative to the predetermined eye positions.

According to one or more embodiments, the VR device 100 can use predetermined eye positions that are customized for a particular user to determine the location on the display screen that corresponds to the user interaction at a position of the touch interface 106. For example, the user or another user (e.g., a device administrator) can enter measurements for the user into the VR device 100 to allow the VR device 100 to calibrate the display screen and the touch interface 106 to the user. To illustrate, the VR device 100 can calibrate a touch mapping between the area of the display screen and the area of the touch interface 106 based on measurements related to the predetermined eye positions for the user. The measurements can include a distance between the user's pupils, a position of the user's pupils relative to each other or to other facial features, or a position of the user's pupils relative to one or more VR device components (e.g., the lenses). By configuring the VR device 100 based on a user's specific measurements, the VR device 100 can customize a configuration of the touch interface 106 and the display screen for a given user.

In one or more embodiments, the user (or another user) can provide the measurements for the user to the VR device 100 by manually measuring and entering the measurements into a configuration interface of the VR device 100. In other embodiments, the VR device 100 can analyze an image of the user to measure the user's facial features and determine the measurements for configuring the display screen and the touch interface 106. For example, the VR device 100 can capture or receive a photograph of the user and automatically determine the predetermined eye positions for the user without requiring the user to manually enter the measurements.

In one or more alternative embodiments, the VR device 100 can use predetermined eye positions based on average eye positions from a database or other data source. Specifically, the database can include average measurements for a left eye position and a right eye position based on measurements from a plurality of people. The VR device 100 can use the average measurements to configure the display screen and the touch interface 106 for use by any user of the VR device 100. Thus, the VR device 100 can provide a single configuration that works with a plurality of users and does not use special configuration for the user.

In one or more additional embodiments, the VR device 100 can include a plurality of preset configurations for the display screen and touch interface 106 so that the user can select the configuration that works best for the user. To illustrate, the user can test different configurations for providing user interactions to the display screen relative to the positions of the user interactions. Testing different configurations can allow the user to identify a configuration for easily determining the position of the user interaction at the touch interface 106 relative to the corresponding location of the display screen.

In alternative embodiments, the corresponding location on the display screen may be based solely on the position of the user interaction at the touch interface 106. Specifically, the touch interface 106 can provide the user interaction to the display screen based on a physical position of the user interaction at the touch interface 106 mapped to the display screen. For example, the VR device 100 can identify a (x, y) coordinate of the user interaction at the touch interface 106 and provide the user interaction to the display screen at a (x1, y1) coordinate mapped to the (x, y) coordinate of the touch interface 106. Thus, some embodiments of the VR device 100 may provide an indication of a user interaction on a location of the display screen independent of predetermined eye positions.

Additionally, the touch interface 106 can include a surface area. In particular, the position of the touch interface 106 at the front of the housing frame 102 can provide a substantially larger area for a touch surface than other locations on the housing frame 102 (e.g., on the side of the housing frame 102 where a user's temple is typically located). Thus, at least a portion of front surface of the housing frame 102 can include the touch interface 106 to provide the user with a surface large enough to perform multi-touch gestures, as described above. For instance, the touch interface 106 can cover almost all the front surface of the housing frame 102, as illustrated in FIG. 1. In other embodiments, the touch interface 106 can cover the entire front surface or only a small portion of the front surface of the housing frame 102. In one or more embodiments, the area of the touch interface 106 is larger than the area of the display screen.

Additionally, or alternatively, the touch interface 106 can extend to other regions of the housing frame 102. Specifically, the touch interface 106 can be located on more than one surface of the housing frame 102. For example, the touch interface 106 can extend from the front surface of the housing frame 102 to one or more sides of the housing frame 102 (including a top side and/or a bottom side of the housing frame 102). Extending the touch interface 106 past the edges of the front surface can allow the user to provide one or more user interactions in a greater number of locations of the VR device 100. Furthermore, a larger touch interface 106 that covers more than one surface of the housing frame 102 can improve the accuracy with which the VR device 100 is able to detect the position of the user interaction with respect to a location on the display screen.

In one or more alternative embodiments, the touch interface 106 can be any shape suitable to receiving user interaction from a user. For example, the touch interface 106 can include an approximately rectangular shape. In another example, the touch interface 106 can include a shape that fits to a front surface of the housing frame 102. To illustrate, the housing frame 102 (and thus, the touch interface 106) can include a front, outer surface that has one of a variety of shapes, including, but not limited to, a rectangle (as illustrated in FIG. 1) or other polygonal shape, an oval or circle, or a combination or plurality of various shapes.

In one or more embodiments, the touch interface 106 can be the same shape as the display screen. Additionally, the touch interface 106 can be the same size as the display screen. For example, the touch interface 106 and the display screen can both be touchscreen devices (e.g., a smartphone), where a first touchscreen device is the display screen and a second touchscreen device is the touch interface 106. Alternatively, a manufacturer can manufacture the VR device 100 to include a touch interface 106 that is the same size as the display screen. In one or more alternative embodiments, the touch interface 106 and the display screen can be different sizes and/or shapes.

Additionally, at least some embodiments of the touch interface 106 can include one or more curved surfaces. In particular, the housing frame 102 can include a surface that includes a curvature that maintains approximately the same curvature across the user's field of vision. In one or more implementations, the display screen may not follow the same curvature as the housing frame 102 due to the use of lenses to expand the field of view from the user's perspective. In other embodiments, the display screen may also have the same curvature as the touch interface 106. As the user provides a user interaction at different angles relative to the predetermined eye positions, the user interaction can feel and also appear to be at the same distance from the user's face based on the curvature of the surface and touch interface 106. Accordingly, the curved touch surface can also provide a touch experience that extends to the full range of the user's vision, including at the periphery of the user's vision.

Figure 2:
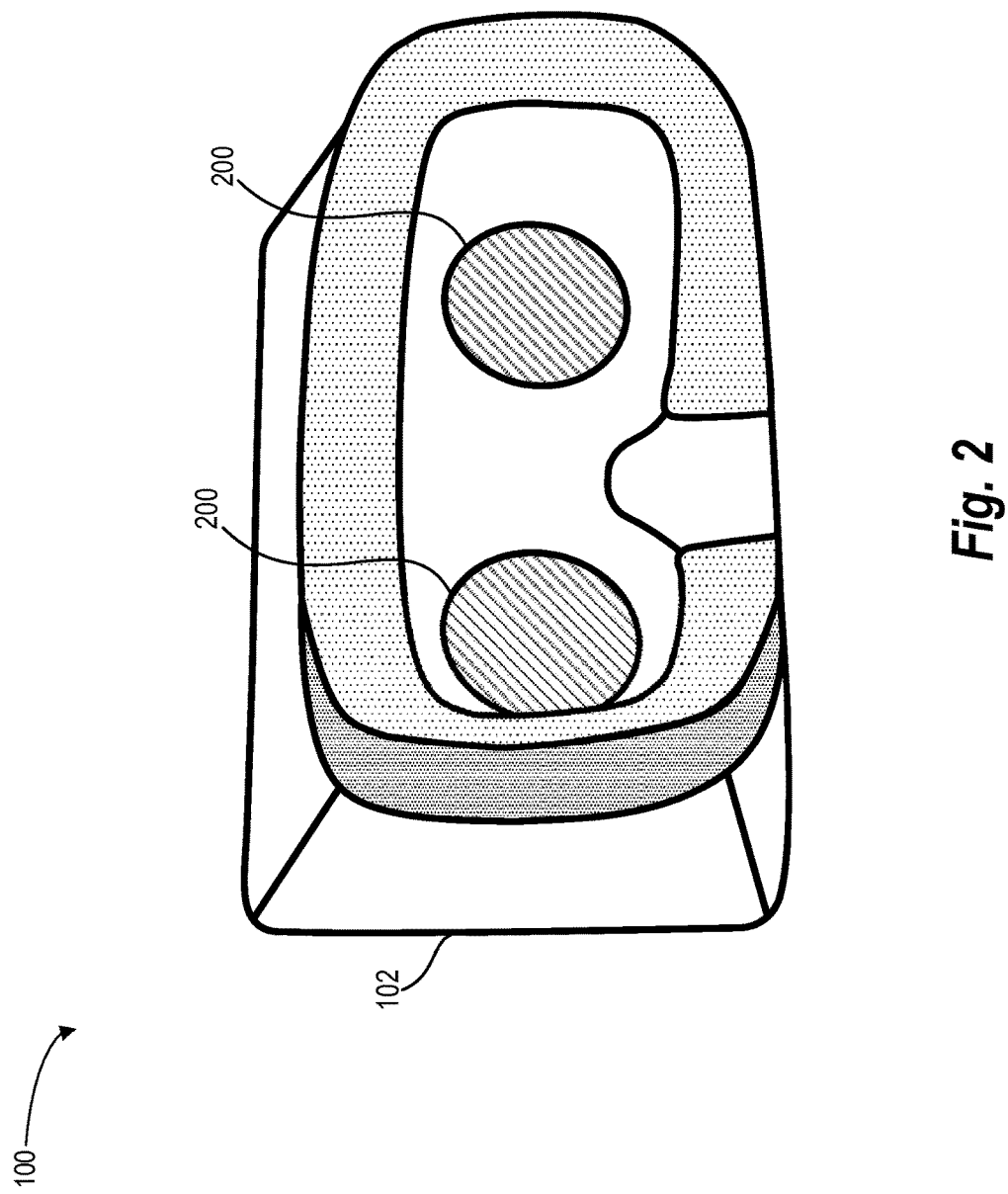
FIG. 2 illustrates another embodiment of a virtual reality headset device in accordance with one or more embodiments.

FIG. 2 illustrates an embodiment of the VR device 100 of FIG. 1. Specifically, FIG. 2 illustrates the housing frame 102 of the VR device 100 with a plurality of lenses 200, as previously mentioned. The lenses 200 modify how content on the display screen appears to the user to provide the virtual reality environment to the user. For example, the lenses 200 can be positioned to correspond to the predetermined eye positions of the user, such that the housing frame 102 includes a left lens corresponding to the left predetermined eye position and a right lens corresponding to the right eye position.

The lenses 200 allow the VR device 100 to present an immersive virtual reality environment to the user that appears to extend to the periphery of the user's vision. To illustrate, as the user views the display screen within the housing frame 102 through the lenses 200, the VR device 100 can use algorithms to display content to the user in a way that makes the content appear to extend to the user's peripheral vision. Additionally, as the user provides user interaction to the touch interface 106, the VR device 100 can also calculate the corresponding location on the display screen based on the presence and position of the lenses 200 within the housing frame 102. In one or more alternative embodiments, the VR device 100 can include a larger display screen that extends to the periphery of the user's vision without lenses 200. In such embodiments, the VR device 100 can provide the user interaction to the display screen without having to account for the presence and position of lenses 200.

Figure 3A:
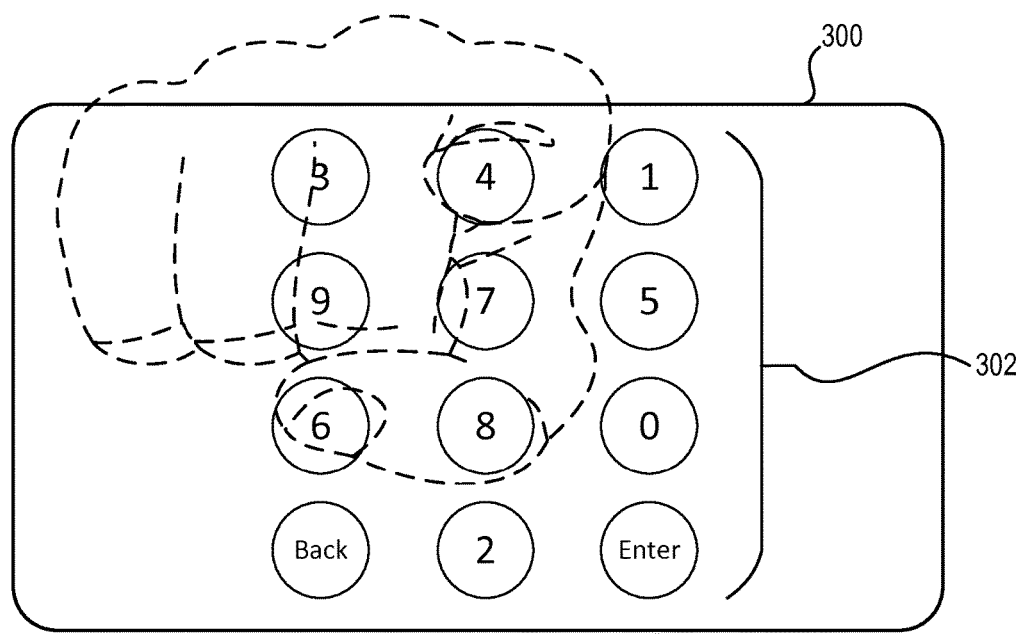
FIGS. 3A-3B illustrate embodiments of a user interface for a virtual reality headset device in accordance with one or more embodiments.
Figure 3B:
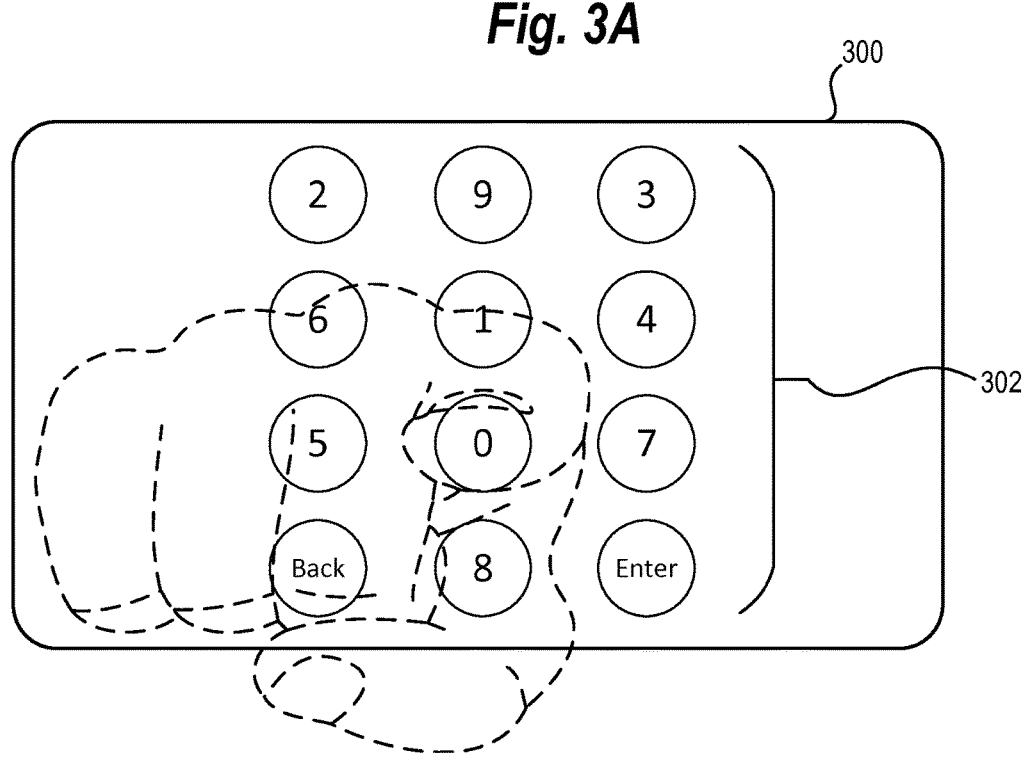

The VR device 100 can leverage the relationship between the position of the user interaction at the touch interface 106 and the corresponding location on the display screen. For example, FIGS. 3A and 3B illustrate embodiments of a user interface 300 that the VR device 100 can display on the display screen. Specifically, the VR device 100 can include security controls that allow the user to prevent others from accessing content on the VR device 100. To illustrate, the user interface can require users to enter a password to gain access to content on the VR device 100.

In at least some embodiments, the VR device 100 can require a password to gain access to any content. For example, when the user turns on the VR device 100, the VR device 100 can present a user interface requiring the user to enter the password. Alternatively, the VR device 100 can require a password to gain access to specific content items. To illustrate, the user can customize the security controls by restricting access to only selected content items.

In one or more embodiments, the user interface can display a digital keyboard with a plurality of selectable elements for entering the password. For example, the user interface can display a keyboard 302 with numerical characters (i.e., a digital keypad), as illustrated in FIGS. 3A and 3B. Alternatively, the keyboard 302 can include other characters, such as alphabetical characters, special characters, or a combination of numerical, alphabetical, and special characters, as may serve a particular embodiment. In at least some instances, the keyboard 302 can use other visual characters or elements, including colors or images. Although FIGS. 3A and 3B illustrate embodiments of a user interface with the keyboard 302 for entering a password, the VR device 100 can display a user interface with a keyboard for inputting various characters for other purposes, such as entering user information or interacting with content on the VR device 100.

According to one or more embodiments, because the touch interface is on the front of the housing frame 102, and user interactions from the user can be visible to others, the VR device 100 can implement additional security measures. Specifically, the VR device 100 can implement security measures to prevent others from being able to guess the user's password based on the position of the user's user interactions on the touch interface. For example, the VR device 100 can vary the display of the characters of the keyboard 302 so that the position of the user interactions when entering the password are not the same each time the user enters the password. By changing the position or content of the selectable elements in the keyboard 302, the VR device 100 can prevent other users from knowing the specific elements that the user selects based only on the position of the user's user interactions on the touch interface.

To illustrate, in one embodiment, the VR device 100 can display the selectable elements of the keyboard 302 in a first layout on the display screen. FIG. 3A illustrates the keyboard 302 with the selectable elements in a first layout with randomized positions for the elements. Specifically, the numbers corresponding to the selectable elements are displayed in a non-conventional layout. To illustrate, the VR device 100 can arrange the numbers corresponding to the selectable elements in a layout other than a typical layout for numbers on a keypad.

The user can select a selectable element by providing a user interaction (e.g. by providing a tap gesture) to the touch interface at a position corresponding to the location of the selectable element on the display screen. For example, as the user provides user interaction to positions on the touch interface, the VR device 100 can provide a response to the user interaction on the display screen so that it appears to the user that the user is interacting with a particular location on the display screen. Thus, the VR device 100 can configure the touch interface and the display screen so that the user can accurately predict the location of the user interaction without being able to see the touch interface. FIG. 3A illustrates a mental illustration of how the user's hand would feel like it is interacting with the display screen, although, and as discussed above, the actual position of the tap gesture to the touch interface may not be exactly aligned with the elements on the display screen, as indicated. In other embodiments, the alignment between the touch interface and the display screen will be substantially the same.

In one or more embodiments, the VR device 100 can provide an indication of the user interaction on the display screen. Specifically, as the user touches the touch interface, the VR device 100 can display the user interaction on the display screen to clearly indicate the location to the user. For example, the VR device 100 can display a visual indication of the user interaction, including, but not limited to, highlighting the location with a semi-transparent indicator (e.g., a circle) or a cursor. Thus, the user can easily locate the location on the display screen in accordance with the user interaction. In additional, or alternative, embodiments, the VR device 100 can provide tactile feedback to the user on the touch interface, play sounds, or provide other indications of the user interaction.

After the user enters the password via the touch interface, the VR device 100 can grant the user access to an operating system, the user's account, or protected content. When the user attempts to access the operating system, the user's account, or protected content a second time, the VR device 100 can request the password again and present the user interface with a keyboard for entering the password. FIG. 3B illustrates the user interface with the keyboard 302 having the selectable elements in a second layout. Specifically, the second layout can be a different layout than the first layout, such that the numbers corresponding to the selectable elements are in different positions in the second layout than the first layout. Thus, when the user enters his or her password the second time, the user interactions will be in different positions on the touch interface.

To illustrate, the VR device 100 can change the positions of the numbers by changing the selectable elements to which the numbers correspond. For example, the numbers can each correspond to a separate selectable element so that when the user selects particular selectable element, the VR device 100 can identify the numerical value corresponding to the selected element. By changing the correspondences between the numbers and the selected elements, the VR device 100 can change the locations of the numbers as displayed on the display screen. Alternatively, the VR device 100 can map the selectable elements and corresponding numbers to specific locations on the display screen and change the mappings to change the locations of the selectable elements and corresponding numbers.

In one or more embodiments, the VR device 100 can also vary the locations of the selectable elements on the display screen. In particular, rather than merely changing the character values of the selectable elements, as in the layouts of FIGS. 3A and 3B, the VR device 100 can additionally, or alternatively, change the locations of the selectable elements. For example, the VR device 100 can distribute the selectable elements of the keyboard 302 in any layout within the display screen. To illustrate, the VR device 100 can randomly distribute the selectable elements in different locations on the display screen each time the VR device 100 displays the keyboard 302. Alternatively, the VR device 100 can distribute the selectable elements in one of a plurality of different, predetermined patterns (e.g., in a diamond pattern, a circle pattern, a rectangle/square pattern, a line, or other shape) on the display screen. Additionally, the VR device 100 can combine the changing distribution of the selectable elements with the changing numbers corresponding to the selectable elements to increase the random distribution of the values and corresponding selectable elements.

According to at least some embodiments, the VR device 100 can include rules for distributing the selectable elements and/or the corresponding values on the display screen. For example, the VR device 100 can include a rule to ensure that no selectable elements overlap. Additionally, the VR device 100 can include a rule to ensure that no selectable elements have the same value as another selectable element. In at least some instances, the VR device 100 can also restrict the positions of the selectable elements to one or more areas of the display screen. The VR device 100 can include buffer zones between the selectable elements to allow the user to easily select the intended selectable element without erroneously selecting another element due to proximity.

In another example, the VR device 100 can include a rule to restrict the number of selectable elements that have the same value as the most recent layout. Specifically, the VR device 100 can verify that the keyboard layout does not have the same organization as the previous keyboard layout by limiting the number of repeat values to a maximum threshold. For instance, the VR device 100 can restrict the number of repeat values in the keypad of FIGS. 3A and 3B to a threshold (e.g., 4 or 5), such that at least half of the values are different from one layout to another. Thus, although at least some of the values can repeat, the layout will not be the same from one input attempt to the next.

Although FIGS. 3A and 3B illustrate a user interaction in relation to a keyboard 302, the user interaction can also perform additional operations within an operating system of the VR device 100. As mentioned, the VR device 100 can display a cursor as a visual indicator of the location of the user interaction on the display screen. For example, a user can control a cursor on the display screen with the user interaction to interact with the virtual reality environment or within other areas of the operating system of the VR device 100. The user can manipulate the cursor by tapping, dragging, swiping, or using other touch gestures on the touch interface in accordance with the position of the user interaction relative to the predetermined eye positions. The cursor can allow the user to perform operations that are typically available on computing devices using cursors, such as highlighting/selecting text, elements or areas of a user interface.

Figure 4:
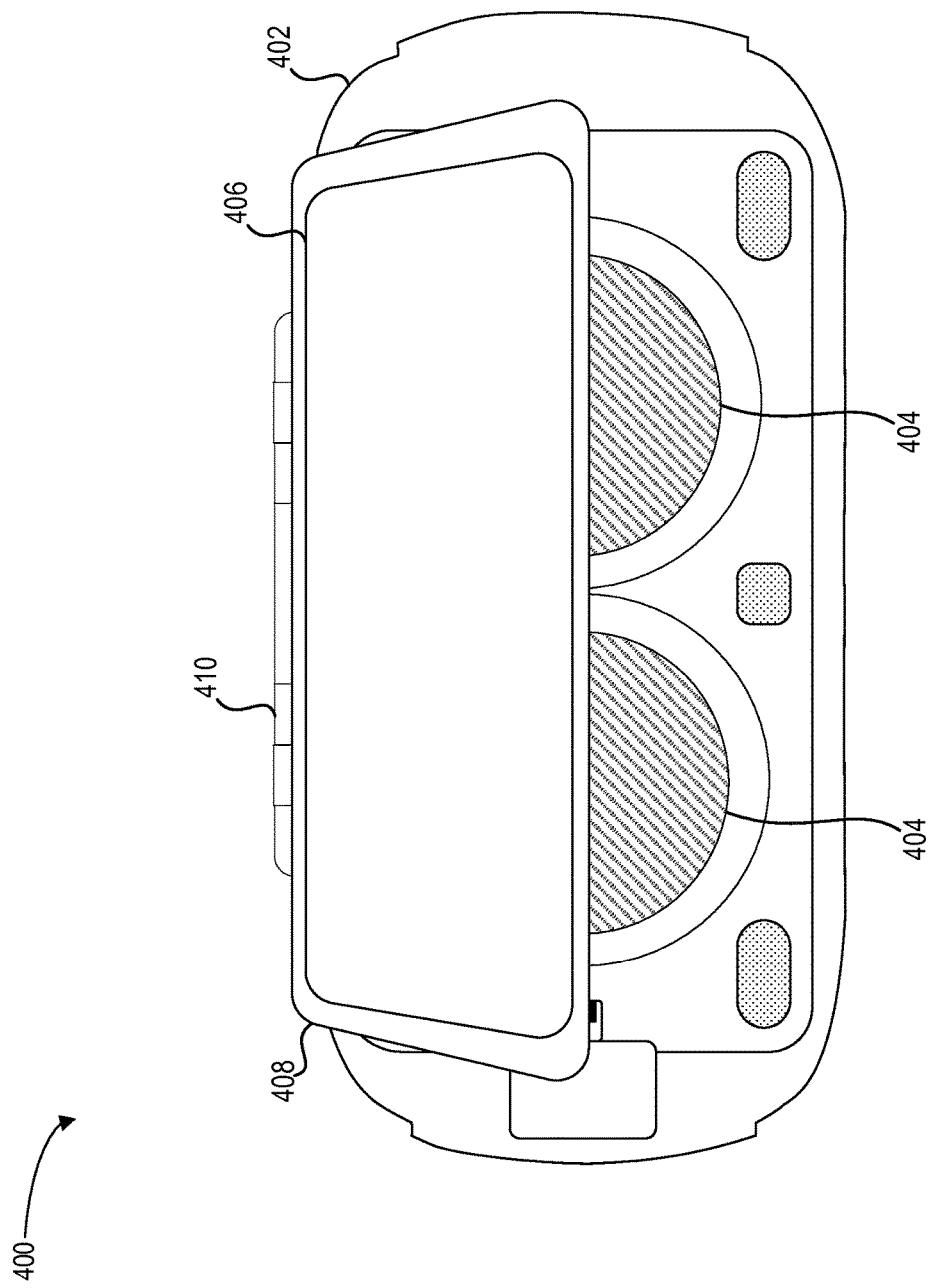
FIG. 4 illustrates another embodiment of a virtual reality headset device in accordance with one or more embodiments.

The VR device 100 can also include a configuration in which the user provides the display screen and/or the touch interface. For example, FIG. 4 illustrates an embodiment of a VR device 400 that includes a housing frame 402, a plurality of lenses 404 (e.g., a pair of lenses), and a touch interface 406, but does not include a display screen. The VR device 400 may include a connector by which the user can connect a computing device with a display screen and a processor. For example, the user can connect a smartphone to the connector within the housing frame 402 such that the display screen of the smartphone is visible to the user through the lenses 404.

The VR device 400 can also include a cover 408 that closes over the smartphone after installing the smartphone into the housing frame 402. Specifically, the cover can include the touch interface 406 that connects to the display screen of the smartphone after the user connects the smartphone to the housing frame 402 and closes the cover 408. For example, the cover 4080 can include a hinge 410 that contains wires or other electronic components that allow the touch interface 406 to interact with the smartphone. Alternatively, the cover 408 and housing frame 402 can include compatible connectors that allow the user to snap the cover 408 onto the housing frame 402 and over the smartphone and to allow the touch interface 406 to interact with the smartphone.

As described above in relation to FIGS. 1-4B, a VR device can include components for providing a virtual reality environment to a user. Specifically, the VR device can include a housing frame with a touch interface on the front surface of the housing frame, a display screen within the housing frame, and lenses within the housing frame and between the display screen and predetermined eye positions. Additionally, the VR device can include a virtual-reality computing device for processing data associated with providing the virtual reality environment to the user.

Figure 5:
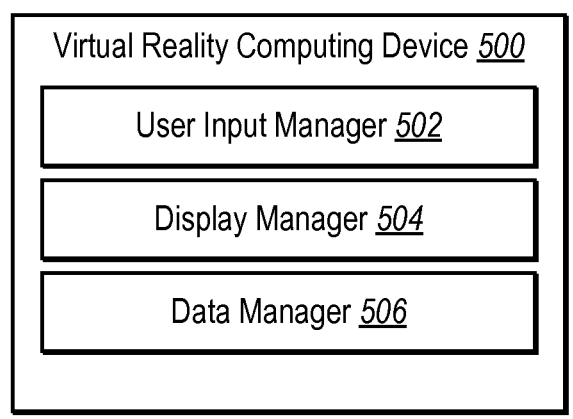
FIG. 5 illustrates a schematic diagram of an embodiment of a virtual reality computing device in accordance with one or more embodiments.

FIG. 5 illustrates a virtual-reality computing device 500 ("VR computing device") that communicates with the touch interface and the display screen. The VR computing device 500 includes a user input manager 502, a display manager 504, and a data manager 506. Although the VR computing device 500 is depicted as having various components, the VR computing device 500 may have any number of additional or alternative components. For example, the VR computing device 500 can include a single processor or a plurality of processors in communication with the touch interface and the display screen.

In one or more embodiments, each of the components and subcomponents of the VR computing device 500 can be in communication with one another using any suitable communication technologies. It will be recognized that although the subcomponents of the VR computing device 500 are shown to be separate in FIG. 5, any of the subcomponents may be combined into fewer components, such as into a single component, or divided into more components as may serve a particular implementation. Furthermore, although the components of FIG. 5 are described in connection with the VR computing device 500, at least some of the components for performing operations in conjunction with the VR computing device 500 described herein may be implemented on other devices. For example, the VR computing device 500 can be a processor in a smartphone or other handheld device that a user inserts into the housing frame of the VR device for providing a virtual reality environment to a user.

The components of the VR computing device 500 can include software, hardware, or both. For example, the components of the VR computing device 500 can include one or more instructions stored on a computer-readable storage medium and executable by one or more processors of the VR computing device 500. When executed by the one or more processors, the computer-executable instructions can cause the VR computing device 500 to perform virtual reality and touch interfacing processes described herein. Alternatively, the components of the VR computing device 500 can include hardware, such as a special purpose processing device to perform a certain function or group of functions. Additionally or alternatively, the components of the VR computing device 500 can include a combination of computer-executable instructions and hardware.

As mentioned, the VR computing device 500 can include a user input manager 502. Specifically, the user input manager 502 can facilitate input by a user to interact with the VR device. For example, the user input manager 502 can detect and interpret user interactions via a plurality of different input methods. To illustrate, the user input manager 502 can manage user interactions from touch interfaces, controllers, cameras, accelerometers, gyroscopes, or other input devices of the VR device.

In one or more embodiments, the user input manager 502 can also process data associated with the position of the user interactions. For example, the user input manager 502 can determine a position of each user interaction by the user on the touch interface. To illustrate, the user input manager 502 can also determine the position of the user interaction at the touch interface relative to the predetermined eye positions. Thus, the user interface manager can determine where the user is touching the touch interface relative to the location of the user's eyes. In alternative embodiments, the VR computing device 500 can include a separate component for determining the position of the touch interface relative to the predetermined eye positions.

The VR computing device 500 can also include a display manager 504 to facilitate display of content on the display screen of the VR device. In particular, the display manager 504 can identify the content to display on the display screen and determine how to display the content on the display screen. Additionally, the display manager 504 can communicate with the user input manager 502 to determine how the user input interacts with the content on the display screen. For instance, for a particular user interaction, the display manager 504 can determine a location on the display device that is consistent with the position of the user interaction at the touch interface relative to the predetermined eye positions. Thus, the display manager 504 can display or otherwise provide user interaction (or inputs, as with multi-touch) to the display screen so that the user can easily understand where the user interaction will be on the display screen based on the position of the user interaction at the touch interface.

The VR computing device 500 can also include a data manager 506 to manage data that the other components in the VR computing device 500 use and/or produce. For example, the data manager 506 facilitates management of data associated with providing a virtual reality environment to the user via the VR device. Specifically, the data manager 506 can communicate with the other components in the VR computing device 500 (i.e., the user input manager 502 and the data manager 506) to obtain data that the components have produced for storage and/or use by one or more of the components.

In one or more embodiments, the data manager 506 can store data that includes, but is not limited to, the predetermined eye positions, user input commands/actions, content for display on the display screens, user profile information, operating system information, and application information. For example, the data manager 506 can communicate with the user input manager 502 to obtain user input data from the user input manager 502 for providing to the display manager 504. Additionally, the data manager 506 can obtain the predetermined eye positions by way of manual entry or by automatic detection using the user input manager 502. The data manager 506 can also store user profile information for the user (or users), including password/security information, preferences, predetermined eye positions, and/or other information about the user that the VR device can use in providing the virtual reality environment to the user. The data manager 506 can also store operating system and application information for providing a user interface to the user.

FIGS. 1-5, the corresponding text, and the examples, provide a number of different systems and devices for providing a virtual reality environment to a user of a VR device. In addition to the foregoing, embodiments can be described in terms of flowcharts comprising acts and steps in a method for accomplishing a particular result. For example, FIG. 6 illustrates a flowchart of exemplary methods in accordance with one or more embodiments.

Figure 6:
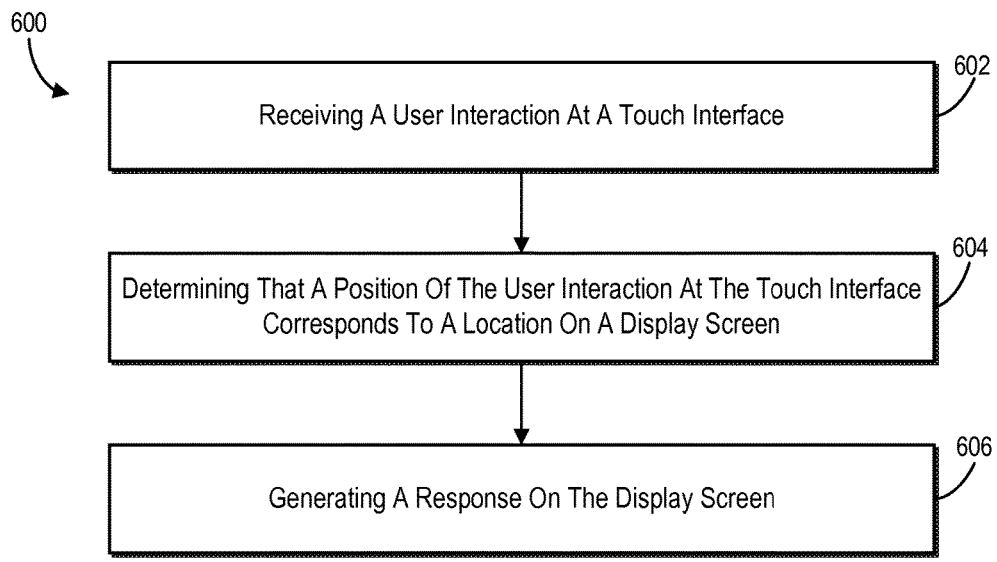
FIG. 6 illustrates a flowchart of a series of acts in a method of providing user interaction to a virtual reality headset device in accordance with one or more embodiments.

FIG. 6 illustrates a flowchart of a method 600 of providing user input using a virtual reality headset device. The method 600 includes an act 602 of receiving a user interaction at a touch interface. For example, act 602 involves receiving a user interaction at a touch interface positioned opposite a pair of lenses secured to a housing frame. To illustrate, act 602 can involve receiving single-touch or multi-touch interactions at one or more positions of the touch interface. Additionally, act 602 can involve detecting one or more characteristics of the user interaction including a type of the user interaction.

Additionally, the method 600 includes an act 604 of determining that a position of the user interaction at the touch interface corresponds to a location on a display screen. For example, act 604 can involve determining that the position of the user interaction is at a first angle relative to the predetermined eye position, and identifying the location on the display screen based on the first angle.

As part of act 604, or as an additional act, the method 600 can include identifying a point for each of the predetermined eye positions based on measurements for a specific user. The method 600 can include comparing the position of the user interaction at the touch interface to the identified point for each of the predetermined eye positions. Additionally, the method 600 can involve mapping the position of the user interaction at the touch interface to the location on the display screen in a configuration for the specific user. Alternatively, the method 600 can include identifying average predetermined eye positions based on a plurality of measurements from a plurality of users.

The method 600 further includes an act 606 of generating a response on the display screen. For example, act 606 involves generating a response on the display screen in accordance with the position of the user interaction at the touch interface. To illustrate, act 606 can involve highlighting a selected element in response to the user interaction. Alternatively, act 606 can involve displaying a cursor at the location on the display screen in response to the user interaction.

For example, the method 600 can include an act of displaying a plurality of selectable elements on the display screen. The method 600 can determine that the position of the user interaction corresponds to a selectable element from the plurality of selectable elements in accordance with the position of the touch input relative to the predetermined eye positions. Act 606 can involve providing, on the display screen, an indication of the position of the user interaction corresponding to the selectable element. Act 606 can further involve providing a visual indication of the user interaction at a location on the display device matching the position of the user interaction relative to the predetermined eye positions.

The method 600 can include an act of receiving a first request to enter a password and displaying, in response to the first request to enter a password, the plurality of selectable elements in a first layout on the display screen. For example, the method 600 can include displaying the plurality of selectable elements in a random layout on the display device. Alternatively, the method 600 can include displaying the plurality of selectable elements in a predetermined layout from a plurality of predetermined layouts on the display device.

Additionally, the method 600 can include an act of selecting an element in accordance with the position of the user interaction relative to a position of the element on the display device. The method 600 can also involve displaying an indication of the selected element at a location on the display device corresponding to the position of the user interaction relative to the predetermined user eye positions.

As an additional act, the method 600 can include receiving a second request to enter the password, and displaying, in response to the second request to enter the password, the plurality of selectable elements in a second layout. For example, the second layout can include a different distribution of elements than the first layout. To illustrate, the method 600 can include an act of creating the second layout by generating a random mapping of values to the plurality of selectable elements. Alternatively, the method 600 can include an act of creating the second layout by randomly distributing a position of one or more of the plurality of selectable elements on the display screen.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
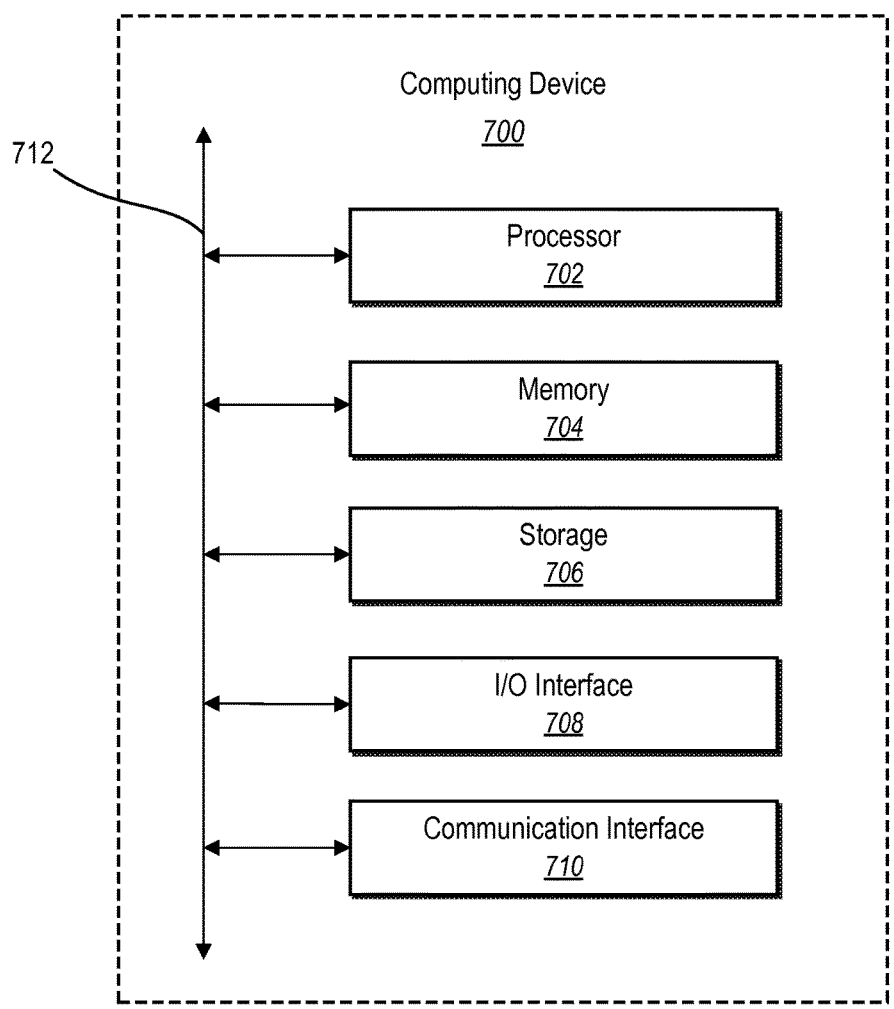
FIG. 7 illustrates a block diagram of an exemplary computing device in accordance with one or more embodiments.

FIG. 7 illustrates a block diagram of exemplary computing device 700 that may be configured to perform one or more of the processes described above. One will appreciate that one or more computing devices such as the computing device 700 may implement the VR device. As shown by FIG. 7, the computing device 700 can comprise a processor 702, a memory 704, a storage device 706, an I/O interface 708, and a communication interface 710, which may be communicatively coupled by way of a communication infrastructure 712. While an exemplary computing device 700 is shown in FIG. 7, the components illustrated in FIG. 7 are not intended to be limiting. Additional or alternative components may be used in other embodiments. Furthermore, in certain embodiments, the computing device 700 can include fewer components than those shown in FIG. 7. Components of the computing device 700 shown in FIG. 7 will now be described in additional detail.

In one or more embodiments, the processor 702 includes hardware for executing instructions, such as those making up a computer program. As an example and not by way of limitation, to execute instructions, the processor 702 may retrieve (or fetch) the instructions from an internal register, an internal cache, the memory 704, or the storage device 706 and decode and execute them. In one or more embodiments, the processor 702 may include one or more internal caches for data, instructions, or addresses. As an example and not by way of limitation, the processor 702 may include one or more instruction caches, one or more data caches, and one or more translation lookaside buffers (TLBs). Instructions in the instruction caches may be copies of instructions in the memory 704 or the storage 706.

The memory 704 may be used for storing data, metadata, and programs for execution by the processor(s). The memory 704 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 704 may be internal or distributed memory.

The storage device 706 includes storage for storing data or instructions. As an example and not by way of limitation, storage device 706 can comprise a non-transitory storage medium described above. The storage device 706 may include a hard disk drive (HDD), a floppy disk drive, flash memory, an optical disc, a magneto-optical disc, magnetic tape, or a Universal Serial Bus (USB) drive or a combination of two or more of these. The storage device 706 may include removable or non-removable (or fixed) media, where appropriate. The storage device 706 may be internal or external to the computing device 700. In one or more embodiments, the storage device 706 is non-volatile, solid-state memory. In other embodiments, the storage device 706 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 708 allows a user to provide input to, receive output from, and otherwise transfer data to and receive data from computing device 700. The I/O interface 708 may include a mouse, a keypad or a keyboard, a touch screen, a camera, an optical scanner, network interface, modem, other known I/O devices or a combination of such I/O interfaces. The I/O interface 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 708 is configured to provide graphical data to a display for presentation to a user. The graphical data may be representative of one or more graphical user interfaces and/or any other graphical content as may serve a particular implementation.

The communication interface 710 can include hardware, software, or both. In any event, the communication interface 710 can provide one or more interfaces for communication (such as, for example, packet-based communication) between the computing device 700 and one or more other computing devices or networks. As an example and not by way of limitation, the communication interface 710 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 710 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 710 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 710 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 712 may include hardware, software, or both that couples components of the computing device 700 to each other. As an example and not by way of limitation, the communication infrastructure 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present disclosure is, therefore, indicated by the appended claims rather than by the foregoing description. All changes that come within the meaning and range of equivalency of the claims are to be embraced within their scope.

What is claimed is:

1. A virtual reality headset device, comprising:
   a housing frame;
   a display screen secured to the housing frame, the housing frame being opaque;
   a pair of lenses secured to the housing frame on a first side of the display screen;
   a touchpad interface secured to a front, outer surface of the housing frame on a second side of the display screen, wherein the second side is opposite the first side, and the front, outer surface of the housing frame obstructs a view through the housing frame, wherein the touchpad interface comprises a curved touchpad surface that extends to a periphery of vision corresponding to predetermined eye positions, wherein a curvature of the touchpad interface is different than a curvature of the display screen;
   at least one processor; and
   at least one non-transitory computer-readable storage medium storing instructions thereon that, when executed by the at least one processor, cause the virtual reality headset device to:
      display a plurality of selectable elements at a plurality of positions on the display screen;
      calibrate, based the predetermined eye positions, a touch mapping between an area of the touchpad interface and an area of the display screen;
      detect a user interaction at the touchpad interface, the user interaction being a touch gesture on the touchpad interface;
      determine, based on the calibrated touch mapping, a coordinate position of the user interaction on a surface of the touchpad interface and a corresponding coordinate position on the display screen to determine a position of the user interaction relative to the display screen;
      identify a selectable element on the display screen by determining that the position of the user interaction relative to the display screen corresponds to a position of the selectable element on the display screen; and
      based on identifying the selectable element, generate a response on the display screen in accordance with the selectable element on the display screen.

2. The virtual reality headset device as recited in claim 1, wherein calibrating the touch mapping between the area of the touchpad interface and the area of the display screen comprises determining a user configuration for the touch mapping based on a user input.

3. The virtual reality headset device as recited in claim 1, further comprising instructions that, when executed by the at least one processor, cause the virtual reality headset device to generate the response by providing, in response to identifying the selectable element on the display screen, a visual indication of the position of the user interaction on the selectable element on the display screen.

4. The virtual reality headset device as recited in claim 1, further comprising instructions that, when executed by the at least one processor, cause the virtual reality headset device to:
   receive a first request to enter a password;
   display, in response to the first request to enter the password, a plurality of selectable elements on the display screen;
   identify a selectable element from the plurality of selectable elements in accordance with the position of the user interaction at the touchpad interface; and
   display an indication of the identified selectable element on the display screen.

5. The virtual reality headset device as recited in claim 4, further comprising instructions that, when executed by the at least one processor, cause the virtual reality headset device to:
   determine a first random layout for the plurality of selectable elements in response to the first request to enter the password; and
   display the plurality of selectable elements in the first random layout on the display screen.

6. The virtual reality headset device as recited in claim 4, further comprising instructions that, when executed by the at least one processor, cause the virtual reality headset device to display the plurality of selectable elements in a predetermined layout from a plurality of predetermined layouts for password entry on the display screen.

7. The virtual reality headset device as recited in claim 1, wherein the instructions that cause the virtual reality headset device to calibrate the touch mapping cause the virtual reality headset device to:
   determine the predetermined eye positions by obtaining eye measurements from a user; and
   calibrate the touch mapping between the area of the touchpad interface and the area of the display screen using the eye measurements from the user.

8. The virtual reality headset device as recited in claim 1, wherein the instructions that cause the virtual reality headset device to calibrate the touch mapping cause the virtual reality headset device to:
   determine average measurements corresponding to eye positions for a plurality of people; and calibrate the touch mapping between the area of the touchpad interface and the area of the display screen using the average measurements for the plurality of people.

9. The virtual reality headset device as recited in claim 1, further comprising instructions that, when executed by the at least one processor, cause the virtual reality headset device to control a location of a cursor on the display screen in accordance with the position of the user interaction at the touchpad interface.

10. The virtual reality headset device as recited in claim 1, further comprising instructions that, when executed by the at least one processor, cause the virtual reality headset device to display the plurality of selectable elements in a first predetermined layout from a plurality of predetermined layouts for password entry on the display screen, the first predetermined layout comprising a different layout shape than a layout shape corresponding to a subsequent request to enter a password.

11. A method of providing user input using a virtual reality headset device, the method comprising:
    calibrating, based on predetermined user eye positions, a touch mapping between an area of a touchpad interface and an area of a display screen, the touchpad interface positioned opposite of a pair of lenses secured to an opaque housing frame, the touchpad interface being secured to a front, outer surface of the housing frame and obstructing a view through the housing frame;
    receiving a user interaction comprising a touch gesture on the touchpad interface in connection with a first request to enter a password;
    providing, for display on a display screen that is positioned between the pair of lenses and the touchpad interface within the housing frame, a plurality of selectable elements at a plurality of positions on the display screen according to a first predetermined layout from a plurality of predetermined layouts for password entry, the first predetermined layout comprising a different layout shape than a layout shape corresponding to a subsequent request to enter a password;
    determining, based on the calibrated touch mapping, a coordinate position of the user interaction on a surface of the touchpad interface and a corresponding coordinate position on the display screen to determine a position of the user interaction relative to the display screen;
    identifying a selectable element on the display screen by determining that the position of the user interaction relative to the display screen corresponds to a position of the selectable element on the display screen; and
    based on identifying the selectable element, generating a response on the display screen in accordance with the selectable element on the display screen.

12. The method as recited in claim 11, further comprising generating the response by providing, in response to identifying the selectable element on the display screen, a visual indication of the position of the user interaction on the selectable element on the display screen.

13. The method as recited in claim 12, wherein determining the position of the user interaction relative to the display screen is further based on a facial feature measurement of the user, comprising:
    determining the predetermined eye positions by obtaining eye measurements from a user; and
    providing, based on the calibrated touch mapping, the visual indication of the user interaction at a location on the display screen matching the position of the user interaction relative to the predetermined eye positions.

14. The method as recited in claim 12, further comprising:
    receiving the first request to enter a password;
    displaying, in response to the first request to enter the password, the plurality of selectable elements in the first predetermined layout on the display screen;
    selecting, in response to the user interaction, the identified selectable element based on the position of the user interaction relative to the display screen; and
    displaying an indication of the selected element on the display screen.

15. The method as recited in claim 14, wherein calibrating the touch mapping comprises:
    determining average measurements corresponding to eye positions for a plurality of people; and
    calibrating the touch mapping between the area of the touchpad interface and the area of the display screen using the average measurements for the plurality of people.

16. The method as recited in claim 11, wherein the touchpad interface comprises a curved touchpad surface that extends to a periphery of vision corresponding to the predetermined eye positions, wherein a curvature of the touchpad interface is different than a curvature of the display screen.

17. A non-transitory computer readable storage medium comprising instructions that, when executed by at least one processor, cause a computer system to:
    display, in connection with a first request to enter a password, a plurality of selectable elements at a plurality of positions on a display screen according to a first predetermined layout from a plurality of predetermined layouts for password entry, the first predetermined layout comprising a different layout shape than a layout shape corresponding to a subsequent request to enter a password, the display screen being secured to an opaque housing frame and the housing frame comprising a pair of lenses secured to the housing frame on a first side of the display screen and a touchpad interface secured to a front, outer surface of the housing frame on a second side of the display screen opposite the first side;
    calibrate, based on predetermined eye positions, a touch mapping between an area of the touchpad interface and an area of the display screen;
    detect a user interaction at the touchpad interface, the user interaction being a touch gesture on the touchpad interface;
    determine, based on the calibrated touch mapping, a coordinate position of the user interaction on a surface of the touchpad interface and a corresponding coordinate position on the display screen to determine a position of the user interaction relative to the display screen;
    identify a selectable element on the display screen by determining that the position of the user interaction relative to the display screen corresponds to a position of the selectable element on the display screen; and
    based on identifying the selectable element, generate a response on the display screen in accordance with the selectable element on the display screen.

18. The non-transitory computer readable storage medium as recited in claim 17, wherein the instructions that cause the computer system to calibrate the touch mapping cause the computer system to:

determine the predetermined eye positions by obtaining eye measurements from a user; and calibrate the touch mapping between the area of the touchpad interface and the area of the display screen using the eye measurements from the user.

19. The non-transitory computer readable storage medium as recited in claim 17, wherein the instructions that cause the computer system to calibrate the touch mapping cause the computer system to:

determine average measurements corresponding to eye positions for a plurality of people; and calibrate the touch mapping between the area of the touchpad interface and the area of the display screen using the average measurements for the plurality of people.

20. The non-transitory computer readable storage medium as recited in claim 17, wherein the touchpad interface comprises a curved touchpad surface that extends to a periphery of vision corresponding to predetermined eye positions, wherein a curvature of the touchpad interface is different than a curvature of the display screen.

* * * * *